United States Patent Office 2,694,878
Patented Nov. 23, 1954

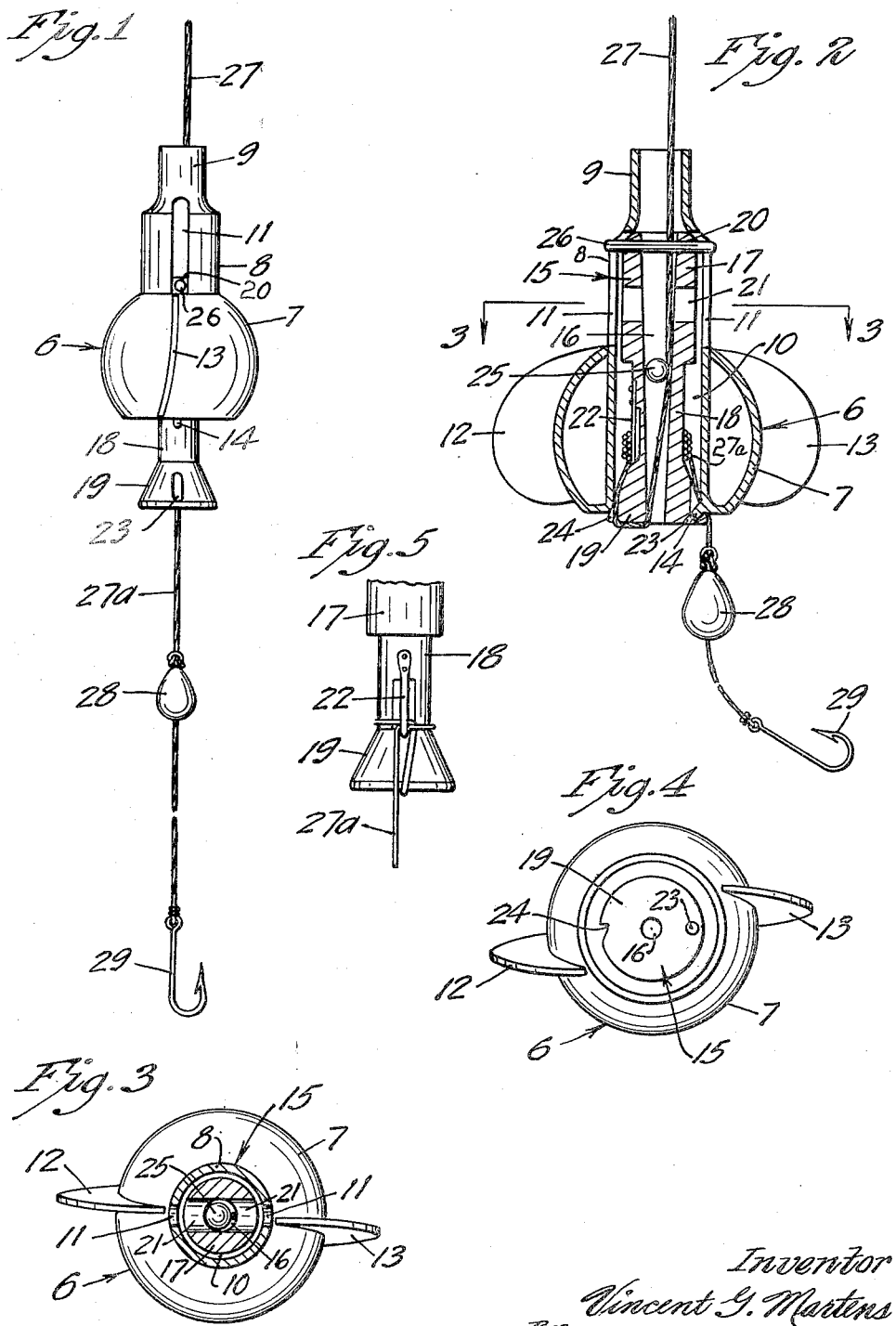

2,694,878

COMBINED CASTABLE BOBBER AND AUTOMATIC SOUNDING DEVICE

Vincent G. Martens, Rockwell City, Iowa

Application May 18, 1950, Serial No. 162,737

15 Claims. (Cl. 43—43.11)

This invention relates to fishing bobbers. More specifically, it relates to fishing bobbers adapted for casting and depth determination.

When fishing with a bobber it is often desirable to be able to cast the bobber to a selected spot which is beyond the reach of the fisherman's pole. It is highly impractical and practically impossible to do this with the portion of the line which is to depend from the bobber in extended position. If the cast is to be accurate and even reasonably safe from inflicting injuries upon the fisherman or others near him this line portion should be retracted. It is imperative too, of course, that the fisherman know the depth of the water body in which he is fishing. Also, it is advantageous at times for the fisherman to be able to change the depth at which he is fishing without drawing his bobber and line in for that purpose. My invention is designed to provide a simple solution for each of these problems.

It is a general object of my invention to provide a bobber capable of being easily and accurately cast with the normally depending portion of the line retained in a retracted position and constructed to automatically release that portion after the cast has been completed.

A more specific object is to provide a bobber which may be cast and which may be utilized upon the first cast to automatically measure the depth of the water body being fished.

Another object is to provide a combined castable bobber and automatic sounding device which will permit fishing at various successive depths without the bobber being drawn in by the fisherman.

Another object is to provide a combined castable bobber and automatic sounding device which will positively preclude any substantial portion of the normally depending line from freeing itself from the bobber to extended position while being cast.

Another object is to provide a combined casting bobber and sounding device which will permit threading of a line therethrough with a minimum of difficulty and inconvenience.

These and other objects and advantages of my invention will more fully appear from the following description made in connection with the accompanying drawings wherein like reference characters refer to similar parts throughout the several views and in which:

Fig. 1 is a side elevational view of one embodiment of my invention with the normally depending portion of the line in an extended position;

Fig. 2 is a vertical sectional view of the device with the normally depending portion of the line in a retracted or casting position;

Fig. 3 is a sectional view taken along line 3—3 of Fig. 2;

Fig. 4 is a bottom elevational view of the device; and

Fig. 5 is a fragmentary side elevational view of the lower portion of the central tubular member and showing the line retaining clip.

One embodiment of my invention, as shown in Figs. 1 to 5, includes a float element indicated generally as 6 and having a lower enlarged portion 7, a slightly reduced medial portion 8, and a still further reduced upper portion 9. A bore 10 of substantial dimensions extends longitudinally through the float 6. The medial portion 8 is provided with a pair of opposite and longitudinally extending slots 11. The lower enlarged portion 7 is provided with a pair of oppositely and laterally extending fins 12 and 13. Suitably mounted in the lower peripheral edge of the float 6 adjacent the bore 10 is an inwardly extending peg 14 of a relatively small diameter.

Mounted within the bore 10 for relative sliding movement is a tubular member indicated generally as 15 and having a downwardly tapering bore 16 extending longitudinally therethrough. The lower portion of this bore 16 is substantially reduced to a diameter slightly larger than that of the lead in a pencil. This tubular member 15 has an upper portion 17, a slightly reduced medial portion 18, and an enlarged lower portion 19, the sides of which taper gradually outwardly toward the bottom. As shown in Figs. 1 and 2, the major portion of this tubular member 15 is disposed at all times within the confines of the float 6, the lower portion 19 being the only portion thereof which ever protrudes from the float. Adjacent the upper end of the tubular member 15 is a relatively small transversely extending bore 20. Disposed below this bore 20 is a relatively large transversely disposed bore 21. Mounted in any suitable manner on one side of the medial portion 18 is a clip member 22, the lower end of which is free but registers with the medial portion 18. Extending at an angle through the lower portion 19 of the tubular member 15 is a small recess or bore 23 which is adapted to receive the peg 14 when the tapered walls of the tubular member 15 register with the lower peripheral edge of the float 6. Formed in the lower periphery of the lower portion 19 of the tubular member 15 is a small slot 24 (see Fig. 4) which is adapted to engage the fish line during the winding operation of the same upon the tubular member 15.

Carried within the tubular member 15 is a small metallic ball 25 which is of a diameter slightly larger than the lower portion of the tapered bore 16. The tubular member 15 is mounted for limited sliding movement within the float 6 by means of a peg 26 which extends through the small bore 20 and rides within the slots 11 to thereby limit the movement of the tubular member 15 relative to the float. Figs. 1 and 2 both show the structure assembled with the line 27 extending therethrough having a normally depending portion 27a and provided with a sinker 28 and a fish hook 29.

Operation

The threading of the line 27 through my combined casting bobber and sounding device is a relatively simple operation. The fisherman needs only to tip the bobber on its side until the little metal ball 25 runs toward the top along the bore 16 and comes to rest in one of the recesses provided by the transverse bore 21. Thereafter there is no obstruction within the bore 16 to hinder or impede the threading of the line 27 through the tubular member 15. Once this has been accomplished the ball may be permitted to return into the bore 16 whereupon it will slide downwardly until it engages the line 27 and retains the same firmly against the wall of the bore 16. The sinker 28, the hook 29, and/or a leader may then be attached to the depending portion 27a of the line 27. The fisherman has then completed all of the necessary preliminary operations for using my device.

In order to determine the depth of the water body in which he is about to fish the fisherman should first select a length of line which he feels sure will more than exceed the depth of the water in the surrounding area and slide the same downwardly through the tubular bore with the ball jam released. He should then wind this depending portion 27a around the medial portion 18 of the tubular member 15, as shown in Fig. 2. By starting the line 27 in the slot 24 provided therefor, this winding operation will be facilitated. After having completed the winding operation the device is ready to be cast and the fisherman need only go through the usual movements required in making a conventional cast. The line member 27 will engage the lower portion of the tubular member 15 and centrifugal force will cause the float 6 to press outwardly against the slanting walls of the lower portion 19 of the tubular member. This pressure which is exerted will pinch or jam the line portion 27a between the tubular member 15 and the float 6 so as to prevent the lower portion 27a of the line from escaping and thereby endangering the fisherman and his surrounding companions by a wide-flying hook. To insure that the line portion 27a will be positively maintained in its retracted or casting position I have provided the peg 14 which is accommodated by the small recess or aperture 23. If by chance a slight portion of the line 27a does escape from the retaining action created between the tubular member 15 and the float 6 it will abut and snub itself about the peg 14. Thus it can be readily seen that there is no danger of the normally depending portion 27a of the line moving to extended position and thereby endangering the fisherman. When the device strikes the water the float member 6 will, of course, be maintained upon the surface of the water. The tubular member 15, being of lesser buoyancy, will descend as far as the pin 26 will permit it. The line portion 27a will thereupon immediately unfurl or play-out and the sinker 28 will descend to the bottom of the water body. As soon as the sinker 28 strikes the bottom the bobber will remain upright but will tilt to one side with the result that the remaining portion of the depending line 27a which is still wrapped about the medial portion 18 of the tubular member 15 will be intact in its original retracted position. When the fisherman sees the bobber turn on its side he will draw the bobber in, whereupon the tubular member 15 will again be drawn snugly within the float 6. The portion of the line 27a which has remained wound around the tubular member 15 will prevent the line from moving relative to the tubular member 15 so that when the fisherman has retrieved the bobber the amount of line which played-out from the tubular member 15 will be the exact depth of the water body in the area in which the bobber was cast. The fisherman then marks the line adjacent the bottom of the tubular member 15 and selects a shorter portion for fishing, depending upon the depth at which he wishes to fish. The remainder of the line 27 he draws upwardly through the tubular member 15, then rewinds it immediately, releases the bobber, and the ball 25 will again engage the line 27 and hold the line immovably relative to the tubular member 15 so that the fisherman will be provided with the exact desired length of line below the bobber with which he wishes to fish.

Thereafter the fisherman, if he has placed the first turn of the line under the clip 22, may cast the bobber out repeatedly without worrying about his line being at varying depths. Each time he wishes to cast he winds the depending portion 27a of the line around the lower portion of the tubular member 16, as described above, and proceeds to cast the bobber to the desired spot in which he wishes to fish. When the bobber strikes the water the normal tendency for the unfurling line portion 27a is to cause the tubular member 15 and the float 6 to rotate on a vertical axis with attendant twisting of the fish line. I have eliminated this undesirable tendency through the provision of the two fins 12 and 13. These fins substantially eliminate any spinning tendency of the float 6. Instead, the float tends to rock in a circular motion as if the lowermost point thereof were pivoted in a ball and socket. The pin 26, of course, precludes any spinning movement between the float 6 and the tubular member 15. Because of the retarding action of the fins 12 and 13 to this normal tendency to spin, the depending line portion 27a is caused to play-out slowly so that the hook 29 and the bait thereon is lowered through the water at a relatively slow speed.

Whenever the fisherman desires to fish at a slightly higher level he can do so by exerting a slight tug on the line 27. The effect of such a tug is to loosen the ball 25 and cause it to move upwardly, whereupon the line 27 will move upwardly through the tubular member 15 a short distance. By immediately releasing the line 27 the ball 25 will again be permitted to drop downwardly and engage the line to maintain the hook 29 at a slightly higher elevation than it was at previously. This can be repeated, or course, until the sinker 28 engages the tubular member 15. Then, of course, a new cast must be made.

I have found that when utilizing my invention in extremely rapid water that the rapid current of water will sometimes cause the ball 25 to be loosened and thereby permitting the entire device to slide downwardly along the line portion 27a to the sinker 28. Since this would obviate all of the other advantages for that type of fishing, I have provided a clip 22 which will preclude against such an occurrence. This difficulty can be overcome by winding one or two loops of the line about the lower portion 19 of the tubular portion 15 and slipping these two loops beneath the clip 22, as shown in Fig. 5. The clip 22 is more than adequate to maintain the entire device at the desired distance above the hook 29. The reduced upper portion 9 of the float 6 is adapted to preclude the entanglement of the line 27 about that portion of the float. By reducing the upper portion of the float member 6 the line 27 will slide freely off that portion in the event it accidentally becomes wrapped around the upper portion of the bobber upon the completion of a cast. If the bobber is formed with straight sides it has been found that frequently the line 27 will be deposited in such a manner as to wrap itself around the float 6 and to engage the same, thereby preventing the fisherman from changing the elevation at which the bait will be maintained. With the tapered upper portions of the float 6, however, the line 27 will slide upwardly and off the upper end of the float.

My invention is easy to operate and ship and simple to manufacture. It effectively eliminates the objection to the use of a bobber when a fisherman desires to fish by casting. It also, as indicated above, provides a ready means for determining the depth of the water in the area in which the fisherman wishes to fish. It has been found to be extremely important to fish at the correct depth during the various seasons of the year and under varying conditions. My invention completely eliminates the usual guess work involved as to the depth of the water in which the fishing is being carried on. At the same time, it substantially eliminates all danger normally attendant with the casting of bobbers.

My device also obviates the need for securing any obstruction to the line itself for the purpose of regulating the depth of the depending portion 27a. The types of casting bobbers previously known have generally required such an obstruction being secured to the line itself to abut against the float member. Such obstructions almost invariably cause difficulty in passing through the eyelets of the casting rod and guide mechanism associated with the reel on the casting rod. With my invention the line itself remains entirely free of any obstruction and it is free to pass through the bobber as desired.

It will, of course, be understood that various changes may be made in the form, details, arrangement and proportions of the parts without departing from the scope of my invention.

What I claim is:

1. A combined castable bobber and sounding device comprising a float element having a bore therethrough and a tubular member limitedly slidable longitudinally within said bore and being of lesser buoyancy than said element, the major portion of said tubular member being disposed within the confines of said float element, said element and said member being adapted to receive a line extending therethrough, said tubular member having a portion thereof adapted to receive thereon a portion of said line, a portion of said bore being of dimensions to snugly receive in a tight fit a portion of said tubular member and said line wound thereabout, whereby said line will be frictionally retained upon said member while said float element and said member are being cast and until said member strikes the water.

2. A combined castable bobber and sounding device comprising a structure having a float element with a bore extending therethrough and a tubular member limitedly slidable in said bore and of lesser buoyancy than said float element, said element and said member being adapted to receive a line extending therethrough, said tubular member having a lower portion thereof adapted to receive thereon a portion of said line wound thereabout and being disposed entirely within the confines of said float element at all times except for said lower portion, said element and said member being adapted to co-operate to retain said portion of said line wound around said member while the structure is being cast and to release the same when said structure strikes the water.

3. The structure defined in claim 2, the upper portion of said float element being reduced in diameter to preclude said line from becoming entangled therewith.

4. A combined castable bobber and sounding device comprising a float having a bore therethrough, a tubular member limitedly slidable in said bore and of lesser buoyancy than said float and being of substantially uniform and balanced weight throughout and free of members which might disturb that balance, said float and said member being adapted to receive a line extending therethrough, the major portion of said tubular member being disposed within said float, said tubular member having the lower end portion thereof adapted to receive thereon a portion of said line wound thereabout, the upper end portions of said float and said member being freely slidable relatively and the lower end portions thereof and being adapted to slide toward each other and together to co-operate to frictionally retain said portion of said line wound around said member while the float is being cast and to release the same when said float strikes the water, and means within said member for releasably holding a predetermined portion of said line immovable relative to said tubular member.

5. A combined castable bobber and device comprising a float having a bore therethrough, a tubular member limitedly slidable in said bore and being disposed entirely within said float except for its lower end portion and being of lesser buoyancy than said float, said float and said member being adapted to receive a line extending therethrough, said tubular member having a portion thereof adapted to receive thereon a portion of said line wound thereabout, said float and said member having complementary engaging surfaces movable to and from each other to co-operatively retain said portion of said line wound around said member while the float is being cast and to release the same when said float and said member strike the water, and clamping means associated with a portion of said tubular member for positively preventing said line from partially escaping said co-operating float and tubular member during the casting operation.

6. A combined castable bobber and sounding device comprising a float having a bore therethrough, a tubular member limitedly slidable in said bore and of lesser buoyancy than said float, the major portion of said tubular member being disposed within the confines of said float, said float and said member being adapted to receive a line extending therethrough, said tubular member having a portion thereof adapted to receive thereon a portion of said line wound thereabout in free sliding relation to said float and within said bore, said float and said member having cooperating engaging surfaces movable vertically to and from each other to co-operatively retain said portion on said line wound around said member while the float is being cast and to release the same when said float strikes the water, and a pair of oppositely and laterally extending fins carried by said float whereby the spinning movement normally imparted to said float by said portion of said line as it unwinds from said tubular member is substantially eliminated.

7. A combined castable bobber and sounding device comprising a float having a bore therethrough, a tubular member limitedly slidable in said bore and of lesser buoyancy than said float, the major portion of said tubular member being disposed at all times within the confines of said float element, said float and said member being adapted to receive a line extending therethrough, said tubular member having a portion thereof adapted to receive thereon a portion of said line wound thereabout, the lower end portions of said float and said member being shaped complementarily and slidable together from non-registering position to registering position and vice versa to co-operatively retain said portion of said line wound around said member while the member is being cast and to release the same when said member strikes the water, and means for releasably holding said line from moving longitudinally through said member in one direction.

8. A combined castable bobber and sounding device comprising a float having a bore therethrough, a tubular member having a downwardly tapered bore extending vertically therethrough, said tubular member being limitedly slidable in said float bore and being disposed entirely within said float except for its lower end portion and being of lesser buoyancy than said float, said float and said member being adapted to receive a line extending therethrough, and movable jamming means carried within said tapered bore of dimensions larger than the diameter of the smallest portion of said tapered bore, said tubular member having a portion thereof adapted to receive thereon a portion of said line wound thereabout, the lower end portions of said float and said member having co-operative registering surfaces slidable vertically relative to each other to co-operatively retain said portion of said line wound around said member while the float is being cast and to release the same when said float strikes the water.

9. The structure defined in claim 8, said tubular member having a recess formed transversely therein of dimensions to accommodate said jamming means and communicating with said bore whereby the threading of said line through said tubular member will be facilitated.

10. A combined castable bobber and sounding device comprising a float having a bore therethrough, a tubular member limitedly slidable in said bore and being disposed entirely within said float except for its lower end portion and being of lesser buoyancy than said float, said float and said member being adapted to receive a line extending therethrough, said tubular member having a portion thereof adapted to receive thereon a portion of said line wound thereabout, said float and said member being adapted to co-operate to retain said portion of said line wound around said member while said member is being cast and to release the same when said member strikes the water, and means secured to the outer surface of said tubular member for positively retaining said line from movement through said tubular member in either direction.

11. A combined castable bobber and sounding device comprising a float having a bore therethrough and a tubular member limitedly slidable longitudinally within said bore and of lesser buoyancy than said float, the major portion of said tubular member being disposed within the confines of said float, said float and said member being adapted to receive a line extending therethrough, said tubular member extending downwardly only from said float and having a portion thereof adapted to receive thereon a portion of said line and having a seat portion adapted to co-operate with a portion of said float to frictionally retain said line therebetween and upon said member while said float and said member are being cast and until said member strikes the water.

12. A combined castable bobber and sounding device comprising a float having a bore therethrough, a tubular member limitedly slidable longitudinally within said bore and of lesser buoyancy than said float, the major portion of said tubular member being disposed within the confines of said float, said float and said member being adapted to receive a line extending therethrough, said member having a seat portion and a lower portion adapted to receive thereon a portion of said line wound thereabout, a portion of said bore being of dimensions to snugly receive said seat portion of said member in a tight fit whereby said line will be frictionally retained upon said member while said float and said member are being cast and until said member strikes the water, and said float and said tubular member being balanced so as to at all times remain in an upright position.

13. A combined castable bobber and sounding device comprising a float having a bore therethrough, an elongated slide element limitedly slidable longitudinally within said bore and of lesser buoyancy than said float, said element being disposed entirely within said float except for its lower end portion, said element being adapted to accommodate a line extending through said float and to receive thereon a portion of said line wound thereabout, a lower portion of said bore being of dimensions to snugly receive in a tight fit a co-operating portion of said tubular member with a portion of said line therebetween whereby said line will be frictionally retained upon said member while said float and said member are being cast and until said member strikes the water, and said float and said slide element forming a unit which is heavier adjacent its lower end to cause the same to at all times remain upright within the water.

14. A combined castable bobber and sounding device comprising a float having a bore therethrough, a tubular member limitedly slidable longitudinally within said bore and of lesser buoyancy than said float and having a lower outwardly tapering portion, the major portion of said tubular member being disposed within the confines of said float, said float and said member being adapted to receive a line extending therethrough, said tubular member having a portion thereof adapted to receive thereon above said tapering portion a portion of said line, a portion of said bore being of dimensions to snugly receive said tapered portion of said member in a tight fit with a portion of said line therebetween whereby said line will be frictionally retained upon said member while said float and said member are being cast and until said member strikes the water, said tapered portion having a line engaging notch adjacent its lower peripheral edge.

15. A combined castable bobber and sounding device comprising a float having a bore therethrough, a tubular member limitedly slidable in said bore and having its upper end disposed at all times within the confines of said float, said tubular member being of lesser buoyancy than said float, said float and said member being adapted to receive a line extending therethrough, said tubular member having a portion thereof adapted to receive thereon a portion of said line wound thereabout, said float and said member having cooperating and registerable engaging surfaces movable toward and away from each other to co-operatively retain said portion of said line wound around said member while the float is being cast and to release the same when said float strikes the water, and a plurality of laterally extending fins carried by said float whereby the spinning movement normally imparted to said float by said portion of said line as it unwinds from said tubular member is substantially eliminated.

References Cited in the file of this patent

UNITED STATES PATENTS

| Number | Name | Date |
|---|---|---|
| 717,237 | Marsters | Dec. 30, 1902 |
| 1,152,755 | Perron | Sept. 7, 1915 |
| 1,906,495 | Stine | May 2, 1933 |
| 2,153,869 | Jones | Apr. 11, 1939 |
| 2,226,331 | Allison | Dec. 24, 1940 |
| 2,254,800 | Furdas | Sept. 2, 1941 |
| 2,493,971 | Johnson | Jan. 10, 1950 |
| 2,501,230 | McHan | Mar. 21, 1950 |
| 2,509,704 | Streitwieser | May 30, 1950 |
| 2,531,806 | Coughlin | Nov. 28, 1950 |
| 2,607,154 | Martens | Aug. 19, 1952 |